Oct. 27, 1970   A. BRISKMAN ET AL   3,536,976

POWER-DRIVEN ELECTRONICALLY CONTROLLED TOOL

Filed March 9, 1967   2 Sheets-Sheet 1

INVENTORS:
ARTHUR BRISKMAN,
CURT WEIDAUER,
THEODORE N. SAATY.

by Sparrow and Sparrow

ATTORNEYS.

*INVENTORS.*
ARTHUR BRISKMAN,
CURT WEIDAUER,
THEODORE N. SAATY.

by Sparrow and Sparrow

ATTORNEYS.

United States Patent Office 3,536,976
Patented Oct. 27, 1970

3,536,976
POWER-DRIVEN ELECTRONICALLY CONTROLLED TOOL
Arthur Briskman, 102 Prince St., New York, N.Y. 10012; and Curt Weidauer, Clinton Corners, N.Y., and Theodore N. Saaty, Newark, N.J.; said Weidauer and said Saaty assignors to said Briskman
Filed Mar. 9, 1967, Ser. No. 621,991
Int. Cl. H02p 5/06
U.S. Cl. 318—443             13 Claims

ABSTRACT OF THE DISCLOSURE

Tool such as for example shears with cutting blades, one of which is relatively movable with respect to the other, a motor and mechanical gear drive means for the movable blade; a power pack with electronic components for controlling the frequency of the operating cycles of the shears. The power pack has a full wave rectifier, a capacitor chargeable by a diode, a relay for opening and closing of the motor circuit. A microswitch is opened once every revolution of a cam attached to the gear drive, for causing the capacitor to discharge into the inductance of the relay to open it. The relay will close and restart the motor for another cycle when the capacitor is discharged. After the cam has passed the microswitch, the capacitor is again charged by the diode.

BACKGROUND OF THE INVENTION

The field of the invention appertains generally to power-driven hand tools, and particularly to motor-driven shears, such as pinking shears, scalloping shears, scissors, snips or the like tool (but not limited thereto) which have two cooperating relatively intermittently or continuously reciprocating blades or members, one of which is stationary while the other performs a shearing or other operation with the stationary blade or member.

Motorized cutting tools are known; the problem involved is that tools of this kind should be efficient, relatively lightweight, economical and easily and readily operated with one hand; such tools also should be capable of cutting a great variety of materials and, therefore, it is necessary to have the facility of adjusting the frequency of the cutting cycle of such shears to the various requirements of the work to be performed. It is intended by this invention to solve these problems.

SUMMARY OF THE INVENTION

The invention consists in such novel features, construction arrangements, combination of parts and improvements as may be shown and described in connection with the device herein disclosed by way of example only and as illustrative of a preferred embodiment. Objects and advantages of the invention will be set forth in part hereafter and in part will be obvious herefrom or may be learned by practicing the invention, the same being realized and attained by means of the instrumentalities and combinations pointed out in the appended claims.

It is an object of the present invention to provide a power-driven cutting tool such as shears preferably having exchangeable blades or members for various cutting or other purposes.

Furthermore, it is an object of the present invention to provide motorized shears with adjustable electronic control means for varying the frequency of the cutting cycles.

Another object of the present invention is to provide a light-weight cutting tool of the kind described which can be operated readily and easily with one hand.

Yet another object of the present invention is to provide power-driven shears which are efficient, of uncomplicated and sturdy construction.

A further object of the present invention is to provide a useful and practical electronically controlled motor driven reciprocable cutting device which can be produced economically. A still further object being to provide time delay means in the electronic controlling system for varying the cutting frequency.

Various further and more specific purposes, features and advantages will clearly appear from the detailed description given below taken in connection with the accompanying drawings which form part of this specification and illustrate merely by way of example one embodiment of the device of the invention.

The invention comprises a power-driven electronically controlled hand operated tool such as shears, snips or like tools (but not limited thereto) which has two cooperating blades or members, one of which is stationarily mounted on a support and the other which is pivotally mounted intermittently or continuously reciprocable relative to the stationary blade or member, which is the case the members are blades, performs a shearing operation with the stationary blade. There is a motor and drive means connecting the motor and the pivoted reciprocating movable blade or member. Cam means is driven by or connected to the drive means. The movable blade has a slotted extension engageable with a spaced projection on the cam means, the latter also having a cam or cam-like protrusion on its periphery; the cam means, the slot and pivotally mounted movable blade constituting a slider-crank motion. Electric switch means (such as a microswitch) is adapted to be intermittently activated by the said cam during rotation of the cam means. The motor is activated receiving current through relay contacts and the movable blade operates continuously reciprocatingly or intermittently due to the rotation of the cam means with its said projection (driving stud) in engagement with the slotted blade arm. The electronic components preferably include a potentiometer control and capacitor or a plurality of capacitors of different values any of which may be selected. The capacitor is charged through a rectifier (diode) and resistor. When the rotation of the cam means causes its cam to open the microswitch the capacitor discharges into the inductance of the relay coil, which breaks the motor circuit and stops it. The time during which the motor is de-energized or de-activated varies with the value of the capacitance feeding the relay coil. When using a capacitor and potentiometer control, the latter is preferably of such high resistance that when its entire resistance is used, the capacitor cannot discharge and the action is continuous. Also the less resistance, the faster the capacitor discharges and the faster the time cycle. A "reverse" switch is provided so that in the event the shear blades jam due to overload this switch is activated momentarily, reversing the current, hence reversing the motor to open the blades.

BRIEF DESCRIPTION OF THE DRAWINGS

In the following description and in the claims, parts will be identified by specific names for convenience, but such names are intended to be as general in their application to similar parts as the art will permit. Like reference characters denote like parts in the several figures of the drawing, in which:

3,536,976

Figure 1:
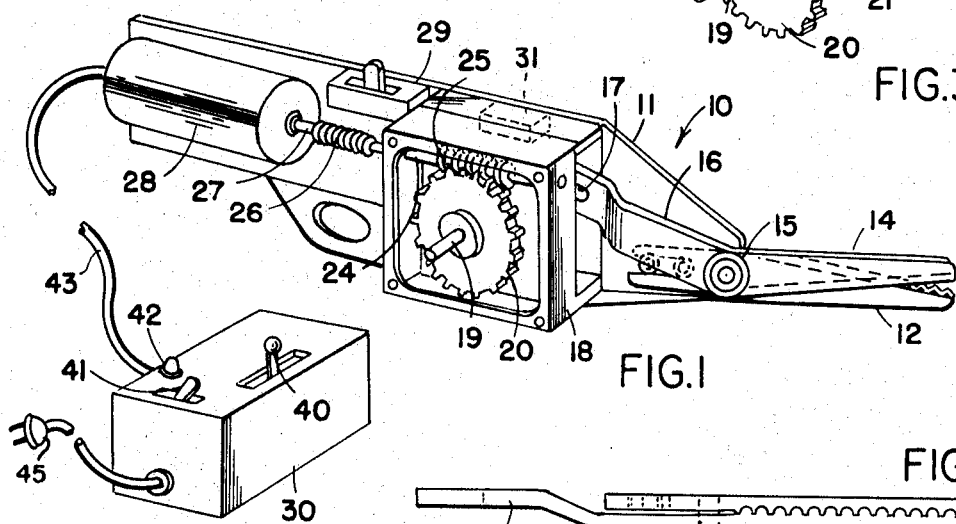
FIG. 1 shows a power-driven cutting tool, according to the invention, in this example shown as pinking shears and the power pack which accompanies it, with housing cover removed.
Figure 4:
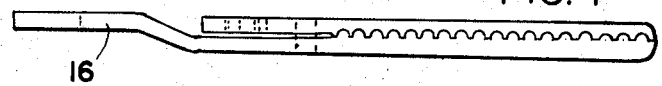
Figure 5:
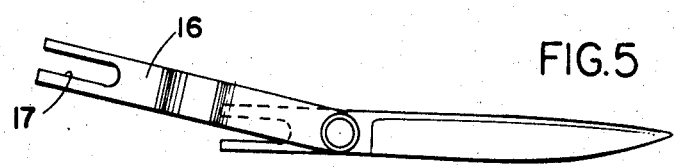
Figure 6:
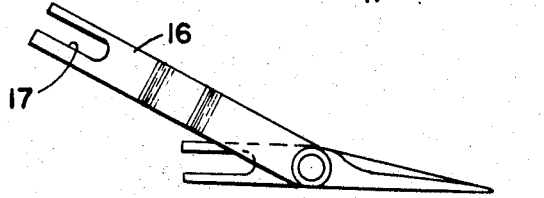
Figure 7:
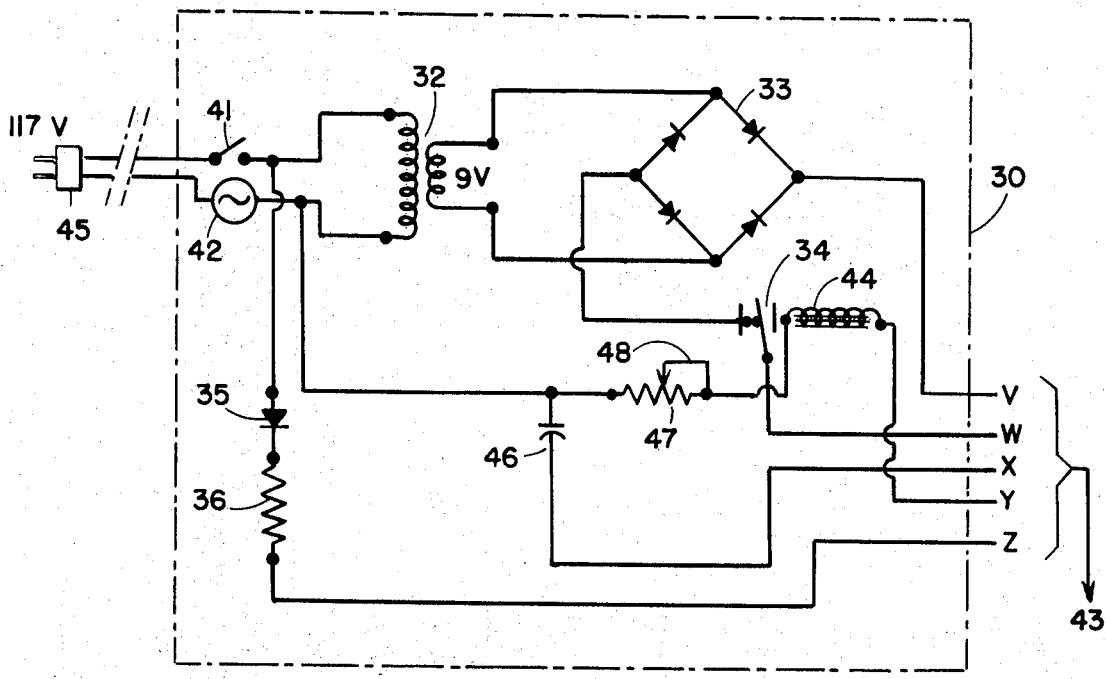
Figure 8:
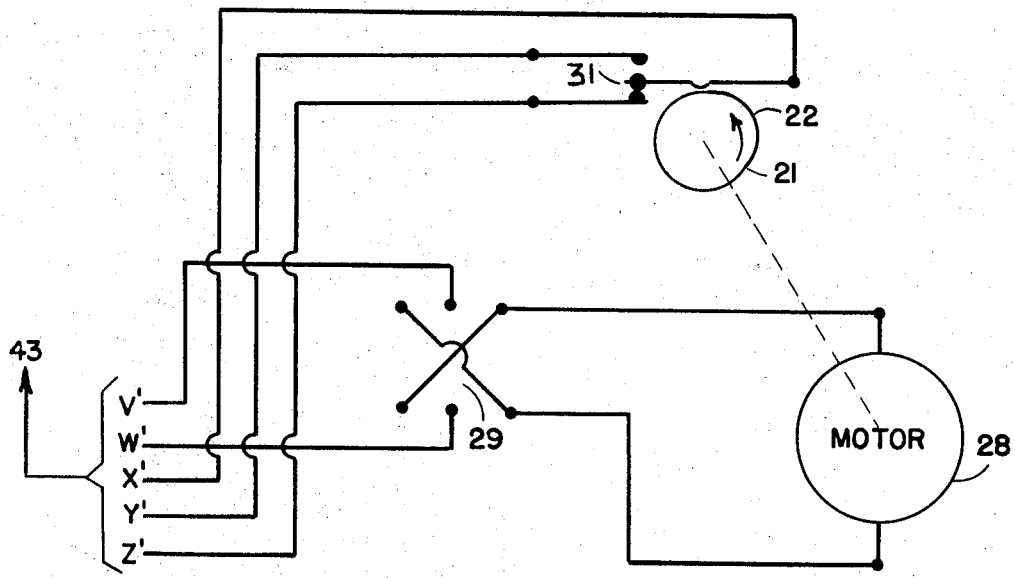
Figure 9:
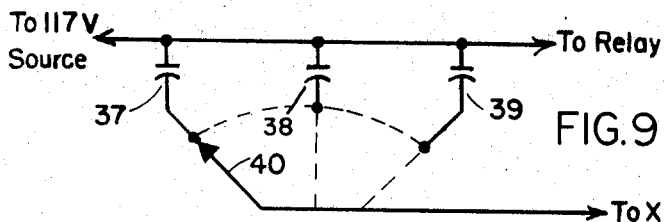

FIG. 4 shows an exchangeable pair of scalloping shear blades;

FIG. 5 shows an exchangeable pair of straight scissor or shear blades;

FIG. 6 shows an exchangeable pair of snip blades;

FIG. 7 shows the electric circuit diagram of the power pack shown in FIG. 1;

FIG. 8 shows the circuit diagram of the power-drive of the device shown in FIG. 1; and FIG. 9 is a modification of relay-inductance feed.

DESCRIPTION OF THE PREFERRED EMBODIMENT

Referring in more detail to the drawings illustrating a preferred embodiment by which the invention may be realized, there is shown in FIG. 1 power-driven shears designated by the general number 10. Mounted on a base plate or support 11 is a stationary blade 12 which is fastened thereon by screws 13 or the like, in such manner that it may be readily exchanged with another blade of the kind as shown in FIG. 4, 5 or 6 or any other desired tool part or member. A movable blade 14 is pivotally mounted on a stud 15 for operatively engaging blade 12. Movable blade 14 also is readily exchangeable. Movable blade 14 has an arm or extension 16 extending from its pivot 15 off-set with relation thereto. Extension 16 has a slot 17 at the end thereof.

A gear housing 18 is also arranged on base plate or support 11 in such manner as to leave a space between base plate 11 and the rear wall of housing 18. A horizontal shaft 19 is located in housing 18, extending through the rear wall of housing 18 into the space between base plate 11 and the rear wall of housing 18. A worm wheel 20 is fastened on shaft 19 in housing 18. Cam means is proved which herein is shown as a disk 21 having a cam-like protrusion 22 on its periphery. Disk 21 is fastened on shaft 19 in the space between base plate 11 and the rear wall of housing 18. There is also a projection or pin 23 extending laterally from disk 21 located thereon at a definite radius, that is, spaced from its center. Pin 23 is arranged to engage slot 17 of arm or extension 16 of movable blade 14. Disk 21, driving stud or pin 23, slot 17 and pivotally mounted movable blade 14 constitute a slider-crank motion. A shaft 24 is located in housing 18 in a direction perpendicularly to shaft 19. A worm 25 is arranged on shaft 24, drivingly engaging worm wheel 20. Shaft 24 is coupled by coupling means (indicated as a helical spring coupling 26) to shaft 27 of motor means such as electric motor 28 which is mounted on base plate 11. A microswitch 37 is located above disk 21 in such manner that cam means 22 is capable of operating microswitch 37. An electric switch 29 is mounted on base plate 11 for switching motor 28 on and off and also for reversing the direction of rotation of motor 28. A suitable cover may enclose the motor and mechanical and other desirable parts.

The operation of motor 28 is electronically controlled by a power pack 30 which can be connected with any alternating electric power source, for example, a 117 volt source by means of a plug 45 (FIG. 7). Power pack 30 comprises a step-down transformer 32, a full-wave or bridge rectifier 33 or other comparable means, a relay 34, a diode 35 or other comparable means, a resistor 36 and preferably a capacitor 46 and adjustable resistor or potentiometer control 47 for time cycle control of the intermittent or continuous reciprocating operation of the movable blade 14. In the example depicted in FIG. 8, the following values are used. Transformer, secondary 9 volts, resistor 36, 200 ohms, capacitor 46, 20 microfarads, potentiometer 47, full resistance 25,000 ohms and relay inductance 44, 5000 ohms. There is also an electric switch 41 for switching power pack 30 on and off and a pilot light 42 may be provided. Power pack 30 is connected with motor 28, microswitch 31 and reversing switch 29 by conductor means such as a cable 43. The terminals $v$, $w$, $x$, $y$ and $z$ of power pack 30 make electrical connection with the corresponding terminals $v'$, $w'$, $x'$, $y'$ and $z'$ (FIG. 8) through a convenient receptacle-plug arrangement (not shown). In lieu of capacitor 46 and potentiometer 47, selective capacitors 37, 38 and 39 of different values may be used for the time cycle or time delay. These capacitors may be switched by selector switch 40.

Figure 2:
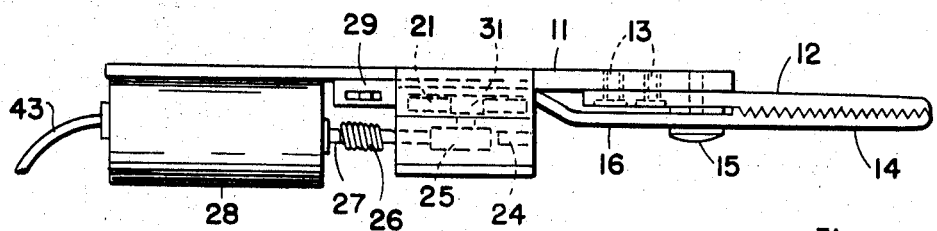
FIG. 2 shows a top view of the shears shown in FIG. 1, with cover removed.
Figure 3:
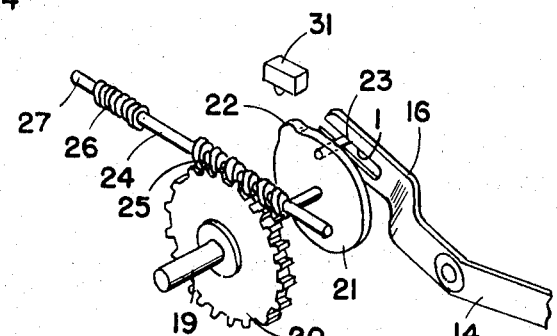
FIG. 3 shows the mechanical drive mechanism in an exploded isometric view.

As heretofore mentioned, blades 12 and 14 shown in FIGS. 1 and 2 as pinking shears blades can be readily exchanged with scalloping shear blades as shown in FIG 4 or with straight shears or scissors blades as shown in FIG. 5, or with sheet metal snips blades as shown in FIG. 6. It is obvious that other blades or members for various other purposes can be used with device, according to the invention, for example, riveting heads for small rivets which are pressed down cold.

The electronic controls operate as follows:

When the power pack is plugged into a conventional 110 volt power source and switch 41 is closed, motor 28 can be energized by closing switch 29. Motor 28 receives low voltage, rectified current through full wave or bridge rectifier 33 and relay 34 and shear blade 16 is thus made to operate. If the modification shown in FIG. 9 is used, one of the three capacitors 37, 38, 39 is switched on by selector switch 40 and is charged through diode 35 and resistor 36. When disk 21 has made substantially one full revolution, cam 22 opens microswitch 31 and the capacitor discharges into the inductance 44 of relay 34 which opens and breaks the motor circuit. After the capacitor is discharged, relay 34 returns to its initial position thus restarting motor 28. After cam 22 passes microswitch 31 the capacitor is again charged by diode 35 and the cycle is repeated again. The time during which motor 28 is switched off, varies with the value of the capacitance feeding coil 44 of relay 34. When using the preferred embodiment of FIG. 8, potentiometer 47 is of such high resistance that when its entire assistance is used by moving switch arm 48, capacitor 46 cannot discharge, the motor will run continuously and blade 14 will reciprocate uniformly. The less resistance cut into potentiometer 47, the faster capacitor 46 discharges and the faster the time cycle.

Thus, the operation of movable blade 14 is performed in cycles, that is reciprocatingly, alternating cutting-dwell-cutting, whereby the dwell time can be varied by capacitor-potentiometer control (FIG. 8), or by selectively switching the capacitors (FIG. 9). If by any chance an overload on the blades occurs or the blades become jammed, the rotation of motor 28 can be reversed by operating reversing switch 29, whereby the blades are opened, enabling the operator to remove the obstacle.

While the invention has been described and illustrated with respect to a certain preferred example which gives satisfactory results, it will be understood by those skilled in the art after understanding the principle of the invention, that various changes and modifications may be made without departing from the spirit and scope of the invention, and it is intended therefor in the appended claims to cover all such changes and modifications.

We claim:

1. Power-driven electronically controlled tool comprising support, a stationary blade member mounted on said support, a swingably movable blade member pivotally mounted on said support for engagement with said stationary blade member, an electric motor mounted on said support, and having a shaft, mechanical drive means for reciprocating said movable blade member, said drive means being coupled with said shaft, first switch means for deactivating said motor, cam means driven by said motor and actuating said switch means, electronic control means including timing means for reactivating said motor after a predetermined interval, thereby imposing an intermittent motion upon said motor for intermittently reciprocating said movable member.

2. Power-driven tool according to claim 1, wherein said cam means is mounted on said drive means.

3. Power-driven tool according to claim 1, and said cam means is a radially extending projection on a portion of said drive means comprising a rotatable disk having a laterally extending projection spaced from its center, and said movable member having an off-set extension engageable with said projection and reciprocated thereby.

4. Power-driven tool according to claim 1, and said mechanical drive means includes a shaft, a worm wheel mounted on said shaft, a worm on said motor shaft, said worm drivingly engaging said worm wheel, a disk on said shaft, a pin protruding substantially perpendicularly over the face of said disk, said movable blade having an extension, said extension having a slot at the end thereof and said pin slidingly engaging said slot.

5. Power-driven tool according to claim 5, said drive means including cam means, a microswitch, said cam means operating said microswitch, and said control means comprising a power pack connected to said motor, said power pack comprising a relay, first rectifier means connectable with said relay and said motor, a plurality of time-delay capacitors, second rectifier means for charging said capacitors, and a selector switch for switching on any one of said capacitors, and said operation of said microswitch through action thereon by said cam means causing said relay to open for stopping said motor until said selected capacitor is charged again by said second rectifier means.

6. Power-driven electronically controlled tool, comprising a stationary member, a pivotally mounted reciprocating movable member, said movable member being arranged for cooperative engagement with said stationary member, a motor, drive means connecting said motor with and reciprocating said movable member, and electronic means for controlling said reciprocating movements of said movable member, said drive means including cam means, first switching means for said motor, said cam means cooperating with said switch means and said switch means cooperating with said electronic means for controlling the reciprocating movements of said movable member, said electronic means comprising a power pack connected to said motor, said power pack comprising a relay, first rectifier means connectable with said relay and said motor, at least one time-delay capacitor, second rectifier means for charging said capacitor, and said operation of said first switch means through action thereon by said cam means causing said relay to open for stopping said motor until said capacitor is charged again by said second rectifier means.

7. Power-driven electronically controlled tool, comprising a stationary member, a pivotally mounted reciprocatingly movable member, said movable member being arranged for cooperative engagement with said stationary member, a motor, drive means connecting said motor with and reciprocating said movable member, and electronic means for controlling said reciprocating movements of said movable member, said drive means including cam means, first switch means for said motor, said cam means cooperating with said switch means and said switch means cooperating with said electronic means for controlling the reciprocating movements of said movable member, said cam means having a laterally extending projection spaced from its center, and an off-set extension connected to said movable member engageable with said projection, said electronic means comprising a power pack connected to said motor, said power pack comprising a relay, first rectifier means connectable with said relay and said motor, at least one time-delay capacitor, second rectifier means for charging said capacitor, and said operation of said first switch means through action thereon by said cam means causing said relay to open for stopping said motor until said capacitor is charged again by said second rectifier means.

8. Power-driven electronically controlled tool, comprising a stationary member, a pivotally mounted reciprocatingly movable member, said movable member being arranged for cooperative engagement with said stationary member, a motor, drive means connecting said motor with and reciprocating said movable member, and electronic means for controlling said reciprocating movements of said movable member, said drive means including cam means, first switch means for deactivating said motor, said cam means actuating with said switch means, said electronic means including timing means for reactivating said motor after a predetermined interval and said electronic means comprising a power-pack connected to said motor, said power-pack comprising a relay, first rectifier means electrically connectable to said motor through said relay, and time cycle control means.

9. Power-driven tool according to claim 8, and said time cycle control means including a capacitor and potentiometer connectable to the coil of said relay, second rectifier means for charging said capacitor, and said operation of said first switch means through action thereon by said cam means causing said relay to open for stopping said motor until said capacitor is charged again by said second rectifier means.

10. Power driven electronically controlled tool comprising a support, a stationary cutting blade mounted on said support, a swingably movable cutting blade pivotally mounted on said support for engagement with said stationary blade, an electric motor mounted on said support, and having a shaft, mechanical drive means for said movable blade, said drive means being coupled with said shaft, electronic control means for imposing an intermittent motion upon said motor with predetermined durations of energized and deenergized states of said motor, a resistance-capacitance network in said electronic control means for determining the timing of said duration of said deenergized state of said motor, cam means linked to said motor, and switch means actuated by said cam means and connected to said electronic control means for deenergizing said motor when said switch means is actuated by said cam means, whereby reciprocating motion is applied to said movable blade member through said energized and deenergized states of said motor.

11. The power driven electronically controlled tool as defined in claim 10 including rectifying means for converting alternating currents from a utility outlet into direct current; a resistance-capacitant timing network connected to said rectifying means for determining the timing of said duration; and relay means actuated through said resistant-capacitant timing network for switching the power to said motor.

12. The power driven electronically controlled tool as defined in claim 10 wherein said cutting blade members are shearing blade members.

13. The power driven electronically controlled tool as defined in claim 10 including means in said electronic control means for varying said duration of said deenergized state of said motor.

References Cited
UNITED STATES PATENTS

| | | | |
|---|---|---|---|
| 1,321,918 | 11/1919 | Herman | 30—228 |
| 2,782,356 | 2/1957 | Mannheimer | 318—346 X |
| 3,221,192 | 11/1965 | Franklin. | |
| 3,262,042 | 7/1966 | Amos | 318—443 |
| 3,351,836 | 11/1967 | Kearns | 318—466 X |
| 3,408,875 | 11/1968 | Briskman et al. | 30—228 X |

ORIS L. RADER, Primary Examiner

R. J. HICKEY, Assistant Examiner

U.S. Cl. X.R.

30—228